US007369390B2

(12) United States Patent
Doser et al.

(10) Patent No.: US 7,369,390 B2
(45) Date of Patent: May 6, 2008

(54) GAS-INSULATED SURGE ARRESTER

(75) Inventors: Bernhard Doser, Waldshut-Tiengen (DE); Walter Schmidt, Bellikon (CH); Daniel Müller, Zürich (CH)

(73) Assignee: ABB Technology AG, Zurich (CH)

(*) Notice: Subject to any disclaimer, the term of this patent is extended or adjusted under 35 U.S.C. 154(b) by 223 days.

(21) Appl. No.: 11/136,537

(22) Filed: May 25, 2005

(65) Prior Publication Data

US 2005/0270719 A1 Dec. 8, 2005

(30) Foreign Application Priority Data

Jun. 4, 2004 (EP) .................................. 04405344

(51) Int. Cl.
*H02H 1/00* (2006.01)

(52) U.S. Cl. ...................................................... 361/120

(58) Field of Classification Search ................. 361/120
See application file for complete search history.

(56) References Cited

U.S. PATENT DOCUMENTS 3,842,318 A * 10/1974 Nitta .......................... 361/120
4,262,318 A * 4/1981 Shirakawa et al. ......... 361/127
4,502,089 A 2/1985 Ozawa et al.
4,814,936 A * 3/1989 Ozawa et al. ............... 361/127
5,517,382 A 5/1996 Leupp et al.
5,548,081 A * 8/1996 Rost ...................... 174/14 BH
5,912,611 A 6/1999 Berggren et al.
5,936,826 A * 8/1999 Schmidt ..................... 361/127
2004/0160723 A1* 8/2004 Wittmann et al. .......... 361/118

FOREIGN PATENT DOCUMENTS

EP 0 036 046 A1 9/1981
EP 0 050 723 A2 5/1982
EP 0 810 613 A2 12/1997
EP 0 875 087 B1 11/1998
EP 1 066 640 B1 1/2001
EP 1 083 579 A2 3/2001

OTHER PUBLICATIONS

European Patent Office Search, Nov. 2004.

* cited by examiner

*Primary Examiner*—Michael Sherry
*Assistant Examiner*—Christopher J Clark
(74) *Attorney, Agent, or Firm*—Buchanan Ingersoll & Rooney PC

(57) ABSTRACT

The surge arrester contains a tubular encapsulation (1) of electrically conductive material that is filled with an insulating gas, an insulator (17) that is held on the encapsulation (1) and serves for supporting a current conductor (R) that is connected to a high voltage, an active part (2R) that is arranged in the encapsulation (1) and comprises at least one varistor column (3) that is aligned along the encapsulation axis (A) and a field control element (6). In order to maintain the manufacturing costs of this arrester at a low level, the field control element (6) and a first plug-type contact (16) of a plug connection (15) are held on the current conductor (R) of the insulator (17), and a high-voltage electrode (4) of the varistor column (3) that is connected in an electrically conductive fashion to the current conductor (R) via the plug connection (15) contains the second plug-type contact (14) of the plug connection (15).

18 Claims, 3 Drawing Sheets

GAS-INSULATED SURGE ARRESTER

TECHNICAL FIELD

The invention is based on a gas-insulated surge arrester according to the preamble of claim 1.

A surge arrester of this type contains an encapsulation of electrically conductive material that is filled with an insulating gas and aligned along a central axis. At least one active part is inserted into the encapsulation and aligned along its axis, wherein said active part comprises varistors as well as a high-voltage electrode and a grounding electrode. The active part also contains means for clamping together a stack of varistors arranged between the high-voltage electrode and the grounding electrode so as to form a mechanically stable varistor column. In order to maintain the dimensions of the encapsulation relatively small while simultaneously subjecting the individual varistors to a uniform load, an element arranged between the active part and the encapsulation is connected to the high-voltage electrode and serves for controlling an electric field that acts in the interior of the encapsulation during the operation of the surge arrester. The arrester may be realized with single-phase or multi-phase encapsulation.

The encapsulation is realized in a shockproof fashion and usually consists of metal, e.g., aluminum, an aluminum alloy or steel, a conductive plastic or an insulating material that is coated with an electrically conductive layer. The encapsulation is filled with an insulating gas such as, for example, sulphur hexafluoride and/or nitrogen with a pressure of a few bar, wherein the encapsulation is usually realized in the form of a tube. Flanged extensions with sealable openings may be arranged on the outside surface of the tube. Such an extension may accommodate, for example, a burst protector or a measuring device or serve as an access point for assembly purposes.

Depending on the voltage and current load, the active part contains only one varistor column or two or more varistor columns that may be electrically connected in series and/or in parallel. Each varistor column usually contains several cylindrical varistors on the basis of doped zinc oxide that are stacked on top of one another. A metal element that serves for absorbing heat or for extending the column may also be arranged between at least two varistors. If two or more varistor columns are provided, insulating elements may also be provided in the columns, namely between two respective varistors or between an electrode and one of the varistors. Sections of the column that are enclosed by insulating elements can then be electrically connected in series in order to form a series circuit of varistor columns.

In a multi-phase surge arrester, the encapsulation accommodates several active parts that are turned relative to one another about the encapsulation axis by an angle that is defined by the number of phases, i.e., the active parts are arranged in the encapsulation in an axially symmetric fashion.

STATE OF THE ART

Gas-insulated surge arresters of the initially cited type are described in patents EP 0 036 046 A1, EP 0 050 723 A2 and U.S. Pat. No. 4,814,936 A. These surge arresters respectively comprise a metal encapsulation that is filled with an insulating gas, e.g., $SF_6$ or $N_2$, and in which one varistor column (EP 0 050 723 A2) or several series-connected varistor columns (U.S. Pat. No. 4,814,936 A) is/are arranged depending on the level of the voltage to be limited. In the state of the art according to EP 0 050 723 A2, the varistor column is held in a porcelain cylinder or the varistor column contains partial varistor columns that are respectively composed of a varistor stack, two electrodes and a porcelain cylinder. In contrast, insulating rods for mechanically stabilizing the varistor columns are provided in the state of the art according to U.S. Pat. No. 4,814,936 A.

In order to maintain the dimensions of the metal encapsulations relatively small, a field control element is provided in each of these surge arresters between the wall of the encapsulation and the varistor column or varistor columns, respectively, namely such that it annularly surrounds the column or columns. This field control element homogenizes the electric field acting in the interior of the housing during the operation of the surge arrester such that the varistors arranged in the varistor column or the varistor columns, respectively, are subjected to a more or less uniform load.

In an encapsulated surge arrester that is known from EP 1 083 579 A2 and contains a varistor column that is embedded in a casing of an elastomer insulating material, the varistor column is stabilized by means of at least one loop-shaped clamp of insulating material, the ends of which lie on two electrodes. A varistor stack arranged between the two electrodes is clamped together by the loop-shaped clamp. A suitable design of the encapsulation makes it possible to achieve a homogenization of the electric field that acts in the high-voltage section of the varistor column.

According to U.S. Pat. No. 5,912,611 A, U.S. Pat. No. 5,517,382 A, EP 0 810 613 A2 and EP 1 066 640 B1, one or more of the aforementioned loop-shaped clamps of insulating material is/are used for mechanically stabilizing the varistor columns in surge arresters for outdoor applications, in which the varistor columns are embedded in an elastomer polymer. These arresters are not provided with field control elements.

DESCRIPTION OF THE INVENTION

The invention characterized in the claims is based on the objective of developing a gas-insulated surge arrester of the initially described type that has a simple design and can be inexpensively manufactured, wherein the invention simultaneously aims to disclose a method for achieving a particularly advantageous manufacture of this arrester. In the surge arrester according to the invention, the field control element and a first plug-type contact of a plug connector are held on the current conductor of the insulator, and a high-voltage electrode of the varistor column that is connected in an electrically conductive fashion to the current conductor via the plug connection contains the second plug-type contact of the plug connection. These measures significantly simplify the manufacture of the surge arrester, namely because the active part as well as the field control element can be manufactured independently of one another and also independently fixed on two different components of the surge arrester, e.g., an encapsulation part and the supporting insulator. In addition, the components can be easily positioned and mechanically connected to one another in a definitive manufacture of the surge arrester. In this case, a secure electrical connection between the current conductor and the active part as well as the current conductor and the field control element is produced by interconnecting the two plug-type contacts.

The field control element usually has a bell-shaped design that is defined by the realization of the varistor column and the encapsulation. It is advantageous with respect to the manufacturing technology that such a design may comprise a metal element that is fixed on the current conductor. The dimensions of this metal element can be realized relatively small if a section of the field control element in the form of a preformed sheet metal part is held on the metal element.

Depending on the specifications of the arrester, the first plug-type contact may form part of the metal element. If the first plug-type contact is subject to strict requirements and substantial subsequent processing is required, it may be advantageous with respect to the manufacturing technology to detachably fix the first plug-type contact on the metal element.

It is also particularly advantageous with respect to the manufacturing technology that the varistor column contains at least one pre-assembled unit with varistor characteristics that comprises at least two electrodes and a first stack of varistors arranged between these two electrodes, as well as at least one loop-type clamp that is supported on the two electrodes and clamps together the varistor stack. Such a pre-assembled unit makes it possible to manufacture the active part and consequently the arrester in a particularly cost-efficient fashion because the individual varistors to be provided in the active part are already properly arranged and fixed in position before the assembly of the arrester. Such a pre-assembled unit also has a simple design. The two electrodes are provided in the varistor column anyhow and, in contrast to insulating tubes or insulating rods, it is possible to directly support the loop-shaped clamp—and, if so required, additional loop-shaped clamps—on the two electrodes in a space-saving fashion and without requiring additional securing means. Since typical electrodes already contain prefabricated supporting points for the loop-shaped clamps, the active part and consequently the surge arrester can be easily assembled, namely by placing the loop-shaped clamps on the supporting points and tightening the clamps, for example, with the aid of a pressing screw that acts upon a pressure plate or by heating loop-shaped clamps containing heat-shrinkable fibers. The stability of the loop-shaped clamps and consequently the operational reliability of the arrester may be compromised if these clamps are arranged in a gas atmosphere, in which aggressive decomposition products that react with certain fiber materials, particularly quartz, are produced during the operation of the surge arrester due to humidity and partial discharges. In such instances, the invention proposes that the material for the loop-shaped clamps consists of a composite on the basis of a fiber-reinforced polymer and that this composite is coated with a protective lacquer that it resistant to decomposition products and/or fibers that are resistant to decomposition products are used.

A pre-assembled unit that axially extends over a greater length is advantageous for certain applications. In this case, the pre-assembled unit may comprise a second varistor stack that is arranged between one of the two first electrodes and a third electrode, as well as at least a second loop-shaped clamp that is supported on the first and the third electrode and clamps together the second varistor stack.

It is particularly advantageous with respect to the manufacturing technology that the varistor column contains at least two pre-assembled units with varistor characteristics that are detachably connected to one another. In this case, large quantities of comparatively short pre-assembled units can be prefabricated in a very cost-efficient fashion. These pre-assembled units can then be very easily assembled into a varistor column during the manufacture of the surge arrester, e.g., with the aid of screw connections.

If the arrester according to the invention is intended for very high voltages, at least two varistor columns should be provided, wherein these varistor columns are electrically connected in series and arranged adjacent to one another. In this case, each varistor column contains at least two insulators, wherein the first insulator isolates electrically two adjacent varistors in the varistor column such that two mutually isolated column sections are formed, and wherein the second insulator serves for separating the potential of a varistor from the potential of an electrode of this varistor column. In addition, at least two current connectors should be provided in such instances, wherein the first current connector serves for connecting the first column section in the first varistor column to the first column section in the second varistor column, and wherein the second current connector serves for connecting the first column section in the second varistor column to the second column section in the first or a third varistor column, respectively.

It proved advantageous to respectively realize the insulators in a tubular fashion and to align the tube axes in the direction of the encapsulation axis. The two annular ends of the insulators respectively provide the tilt-proof support for a varistor or an electrode of the varistor column and, in addition to the loop-shaped clamps, contribute significantly to the mechanical stability of the active part.

In order to simplify the manufacture of an arrester that contains several varistor columns, at least one of the current connectors should be realized in the form of a detachable connection, particularly a plug connection. At least part of the varistor columns can be manufactured very easily independently of the current connectors required for realizing the series circuit by mechanically connecting the pre-assembled units. The desired circuit can be realized after the varistor columns are completed by closing the detachable connection.

Since the insulators provided in the multi-column active part are subjected to significant loads during the operation of the arrester according to the invention, it is advantageous to arrange a field control electrode on at least one of the two tubular ends of the insulators. This not only homogenizes the electric field acting in the insulator, but this electrode simultaneously serves for centering the adjacent varistor in the varistor column. It is advantageous to provide the field control element with an annular bead. This bead serves for receiving the tubular end and for centering the insulator. In order to additionally reduce the number of parts, the current connector may be realized on the field control electrode. If at least one ventilation opening is arranged in the tubular wall of the insulator, the insulating gas rapidly flows into the interior of the insulator during the assembly and during the operation of the arrester and thusly always ensures the operational reliability of the arrester according to the invention.

If the surge arrester is used for limiting a multi-phase high voltage, the insulator supports several current conductors that are respectively connected to one of the phases, and an active part arranged in the encapsulation is assigned to each of these phase conductors, wherein said active part respectively comprises a varistor column that is aligned along the encapsulation axis, as well as a high-voltage electrode and a grounding electrode. In addition, each of the active parts is surrounded by a field control element, and the field control element and a first contact of a plug connection are held on the phase conductor of the insulator assigned to each respective phase. In this case, a high-voltage electrode of the varistor column that is connected in an electrically conductive fashion to the assigned phase conductor via the plug connection contains the second plug-type contact of the plug connection.

The following process steps are carried out in an advantageous method for manufacturing a surge arrester according to the invention for high voltages up to approximately 250 kV:

a pre-assembled unit that is realized in the form of an active part and aligned in the direction of the encapsulation axis is fixed on a section of the encapsulation that is realized in the form of a mounting plate;

a section of the encapsulation that is realized in the form of a tube is axially slipped over the active part and is fixed on the mounting plate, and the active part is subsequently connected to the at least one current conductor by setting the prefabricated supporting insulator that already holds the field control electrode and the first plug-type contact on the free end of the tube, while simultaneously producing the plug connection.

The following process steps are carried out if the arrester according to the invention is intended for higher voltages:

a first pre-assembled unit with varistor characteristics that contains a grounding electrode and a first intermediate electrode and is aligned in the direction of the encapsulation axis is fixed on a section of the encapsulation that is realized in the form of a mounting plate;

a second pre-assembled unit with varistor characteristics that contains a second intermediate electrode and the high-voltage electrode and is aligned in the direction of the encapsulation axis is detachably fixed on the first pre-assembled unit such that the active part is completed, a section of the encapsulation that is realized in the form of a tube is axially slipped over the active part and fixed on the mounting plate, and the active part is subsequently connected to the at least one current conductor by setting the prefabricated supporting insulator that already holds the field control electrode and the first plug-type contact on the free end of the tube, while simultaneously producing the plug connection.

BRIEF DESCRIPTION OF THE FIGURES

Embodiments of the invention are described in greater detail below with reference to the figures. The figures show.

WAYS FOR REALIZING THE INVENTION

Figure 1:
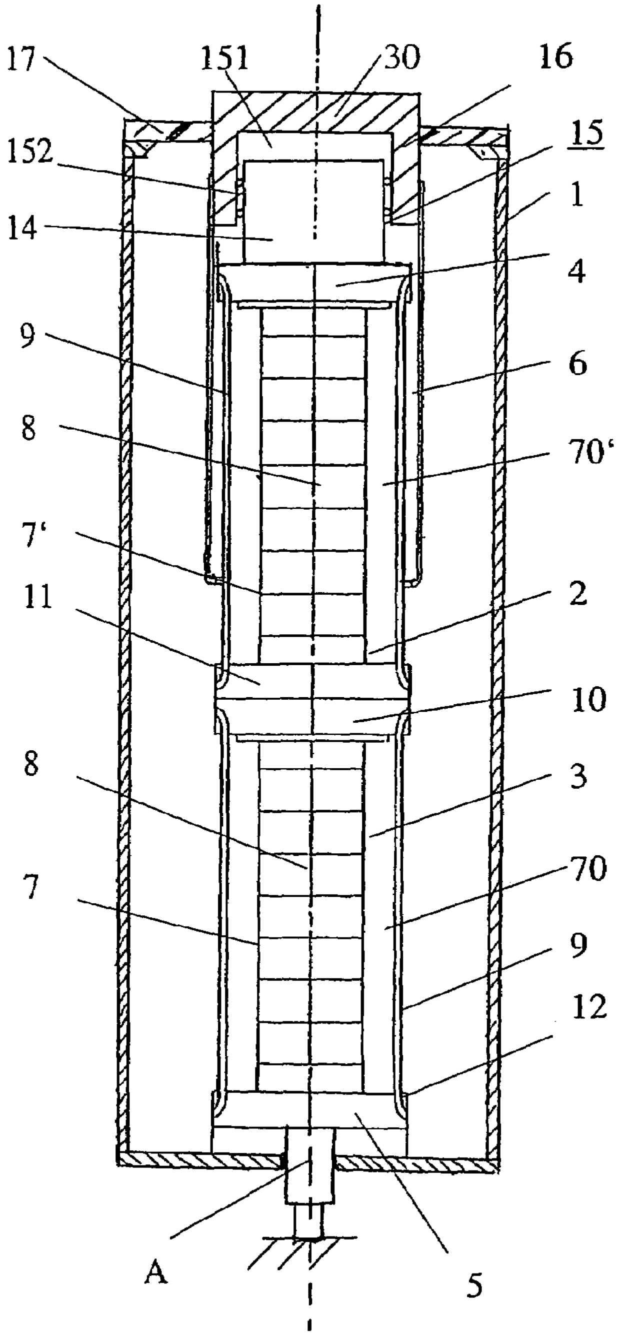
FIG. 1 a view of a first embodiment of the gas-insulated surge arrester according to the invention with an axially symmetrical encapsulation, wherein the active part arranged in the encapsulation contains a varistor column that is composed of two pre-assembled units with varistor characteristics, and wherein the encapsulation, a field control element and a plug connection are illustrated in the form of a section along the encapsulation axis.

Equally acting components are identified by the same reference symbols in all figures. The surge arrester illustrated in FIG. 1 contains a tubular metal encapsulation 1 that is realized in the form of a pot, in which an active part 2 is arranged such that it is aligned along the encapsulation axis A. The active part comprises a varistor column 3, a high-voltage electrode 4, a grounding electrode 5 and an element 6 for controlling an electric field that acts in the interior of the encapsulation 1 during the operation of the surge arrester, wherein said element 6 is arranged between the varistor column 3 and the encapsulation 1 and connected in an electrically conductive fashion to the high-voltage electrode 4.

The varistor column 3 contains two stacks 7 and 7' that lie on top of one another along the column axis and are composed of varistor elements 8 in the form of solid cylinders consisting of nonlinear high-resistivity material, e.g., on the basis of metal oxide, particularly suitably doped ZnO. The stacks 7 and 7' are mechanically stabilized by means of electrically insulating loop-type clamps 9 that are respectively supported with a certain prestress on the grounding electrode 5 and an intermediate electrode 10 and on an intermediate electrode 11 and the high-voltage electrode 4. Two portable pre-assembled units 70 and 70' with varistor characteristics can be manufactured independently of the encapsulation 1 due to this mechanical stabilizing arrangement. The two pre-assembled units are detachably connected to one another such that the varistor column 3 or the active part 2 is respectively formed. The detachable connection can be realized, for example, in the form of a screw connection or a pressing or clamping connection between the two intermediate electrodes 10, 11.

Each of the aforementioned electrodes contains two holding arrangement 12 (only indicated at the electrode 5), on which one respective end of two loop-type clamps 9 is supported. Depending on the dimensions of the varistor column or the pre-assembled units 70, 70', respectively, it may suffice to provide only one loop-type clamp or three or more loop-type clamps may need to be uniformly distributed in the circumferential direction of the column.

The loop-type clamps 9 consist of a material that is resistant to decomposition products of the insulating gas. This material is subject to different requirements depending on the composition of the insulating gas, wherein these requirements are significantly stricter for an insulating gas on the basis of sulphur hexafluoride than an insulating gas on the basis of nitrogen. Such a material preferably consists of a composite on the basis of fiber-reinforced polymers. The fiber reinforcement usually consists of wound glass or polymer fibers, particularly polyester, polyamide or polyimide fibers. However, the fiber reinforcement may also consist of structures that are incorporated into the polymer of the composite, for example, woven fabrics, bands or mats. The composite is coated with a protective lacquer that is resistant to decomposition products in order to protect the fiber reinforcement. Alternatively or additionally, the fibers and, if so required, the polymer for embedding the fibers may consist of a material that is resistant to decomposition products. The loop-type clamps practically may have any cross-sectional profile between round and triangular. However, a rectangular profile is preferred for reasons of manufacturing technology.

Instead of incorporating two pre-assembled units, the varistor column 3 may comprise only one pre-assembled unit or three or more pre-assembled units. The varistor column 3 preferably consists of only one pre-assembled unit such that the single intermediate electrode 13 shown in FIG. 2 can be used. The holding arrangements 12 are realized on this intermediate electrode 13. In order to maintain the dimensions of this intermediate electrode small in the direction of the column axis, the holding arrangement 12 for the loop-type clamps 9 assigned to the two partial columns 7 and 7' are offset relative to one another referred to the circumferential direction of the electrode 13. In the embodiment according to FIG. 3, the varistor column 3 consists of the two pre-assembled units 70 and 70' and a third pre-assembled unit 70" that is installed into the varistor column 3 between these two pre-assembled units and contains a varistor stack arranged between two intermediate electrodes 10' and 11'.

Depending on the voltage levels, in which the arrester according to the invention is utilized, the varistor column 3 may have a length on the order of meters. During the operation of the varistor, the varistor column is heated and expands in the direction of the column axis. This is the reason why the high-voltage electrode 4 contains a plug-type contact 14 of a plug connection 15 that is fixed on or integrated into a part of this electrode in an electrically conductive fashion. When the length of the varistor column 3 changes during the operation of arrester, the contact element 14 slides in the direction of the column axis in an axially aligned bore 151 of a stationary mating contact 16 of the plug-type contact arrangement and thusly compensates this length change. The current transfer from the stationary plug-type contact 16 to the movable plug-type contact 14 is ensured by an annular contact spring element 152. The stationary plug-type contact 16 and the field control element 6 are held on a current conductor 30 that, in turn, is supported on an insulator 17 that seals the encapsulation 1 in a gas-tight fashion. The current conductor 30 can be connected to a high-voltage line to be monitored with the arrester. The plug-type contact 16 may be realized in the form of a socket or a pin as shown.

Figure 4:
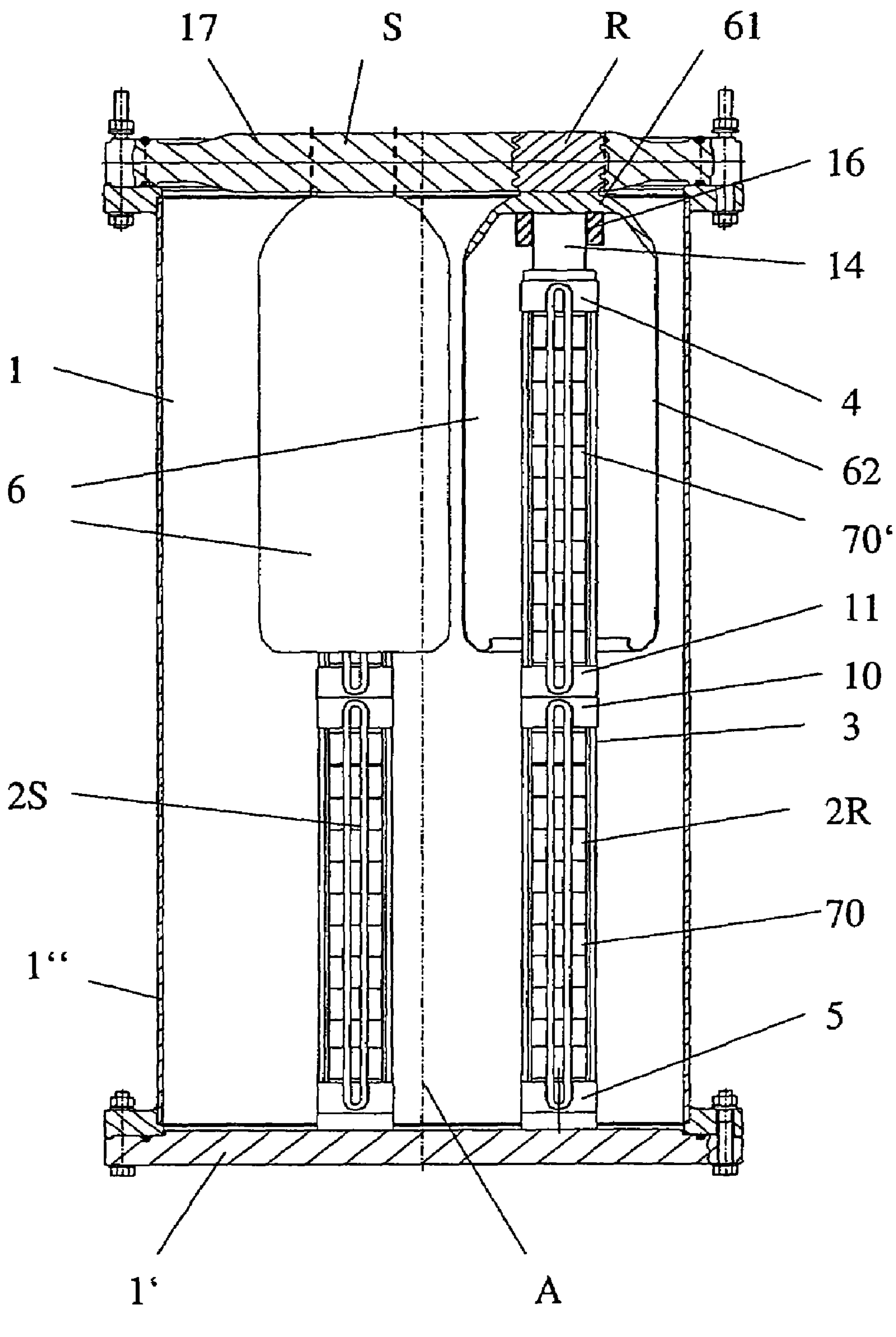
FIG. 4 a view of a fourth embodiment of the gas-insulated surge arrester according to the invention, wherein this surge arrester comprises several active parts that are respectively assigned to one of the phases of a multi-phase high voltage.

The arrester may also be realized with a multi-phase encapsulation as indicated in a fourth embodiment of the arrester according to the invention that is illustrated in FIG. 4. In this case, the insulator 17 supports several current conductors R, S that are respectively assigned to one phase of a multi-phase high voltage. Each of these phase conductors R, S is assigned an active part 2R, 2S that is arranged in the encapsulation 1 and contains a varistor column 3 aligned along the encapsulation axis A, as well as a high-voltage electrode 4 and a grounding electrode 5. Each of the active parts is surrounded by a field control element 6. The field control element 6 and the plug-type contact 16 of the plug connection are held on the respective current conductors R and S of the insulator 17 for each phase, for example, with the aid of one or more screws, wherein the high-voltage electrode 4 contains the plug-type contact 14 of the plug connection to be respectively produced with the current conductor R or S or with a not-shown current conductor of a third phase. The field control element 6 contains a metal element 61 for each phase that is realized, for example, by means of casting, machining and/or forming and fixed on the assigned current conductor R. A section 62 of the field control element 6 is realized in the form of a preformed sheet metal part and held on this metal element 61. The plug-type contact 16 may form part of the metal element 61. However, it may be advantageous to detachably fix the plug-type contact 16 on the metal element 61, for example, by means of screws. In any case, the two plug-type contacts 14 and 16 and the field control element 6 have a common axis that is formed by the axis of the varistor column 3.

The arrester can be manufactured in a particularly simple fashion because the varistor column 3 contains at least one pre-assembled unit 70, 70' with varistor characteristics and the plug-type contact 16 and the field control element 6 are held on the respective current conductors R and S (on the current conductor 30 only in the embodiment according to FIG. 1).

Figure 2:
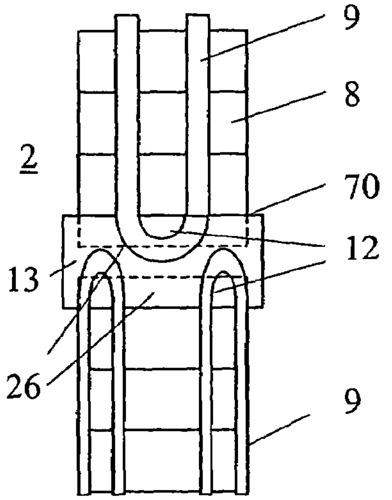
FIG. 2 a view of part of the varistor column of a modified second embodiment of the gas-insulated surge arrester according to FIG. 1.

If the active part consists of only one pre-assembled unit 70 with varistor characteristics as in the embodiment according to FIG. 2, this pre-assembled unit is aligned in the direction of the encapsulation axis A and fixed on the mounting plate 1' of the encapsulation 1 shown in FIG. 4, e.g., with the aid of screws. Subsequently, a section of the encapsulation 1 that is realized in the form of a tube 1" is axially slipped over the active part and fixed on the mounting plate 1' in a gas-tight fashion, namely also with the aid of screws and one more ring seals. Subsequently, the active part is connected to the open end of the tube 1" by attaching the prefabricated supporting insulator 17 that already holds the field control electrode 6 and the plug-type contact 16 in a gas-tight fashion, namely while simultaneously producing the plug connection 15 with the current conductor 30. After the interior of the encapsulation 1 is filled with the insulating gas through a not-shown sealable opening, the arrester is functional and can be attached to a flange of a gas-insulated switchgear on its end that is closed by the insulator 17.

Figure 3:
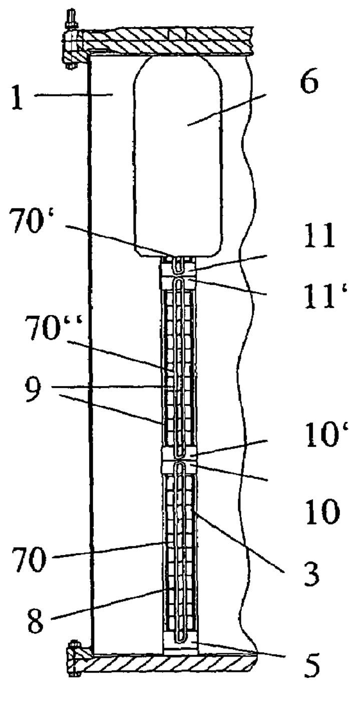
FIG. 3 a view of part of a third embodiment of the gas-insulated surge arrester according to the invention.

If the varistor column contains several pre-assembled units with varistor characteristics as it is the case in the embodiments according to FIGS. 1, 3 and 4, a pre-assembled unit 70 that contains the grounding electrode 5 and an intermediate electrode 10 and is aligned in the direction of the encapsulation axis A is initially fixed on the section of the encapsulation that is realized in the form of a mounting plate 1'. In the embodiment according to FIGS. 1 and 4, a pre-assembled unit 70' with varistor characteristics that contains the intermediate electrode 11 and the high-voltage electrode 4 and is aligned in the direction of encapsulation axis A is detachably fixed on the pre-assembled unit 70 in order to complete the varistor column 3 or the active part 2, respectively. In the embodiment according to FIG. 3, the pre-assembled unit 70" with the intermediate electrode 10' is detachably fixed on the intermediate electrode 10 of the pre-assembled unit 70 instead of the pre-assembled unit 70', wherein this pre-assembled unit 70' is then correspondingly connected in a detachable fashion to the pre-assembled unit 70". If the surge arrester is realized in the form of a multi-phase arrester and contains several active parts that are respectively assigned to one of the phases, for example, as with the active parts 2R, 2S shown in FIG. 4, all active parts are assembled correspondingly. The tube 1" is slipped over the thusly assembled active parts, and the surge arrester is completed as described above.

Figure 5:
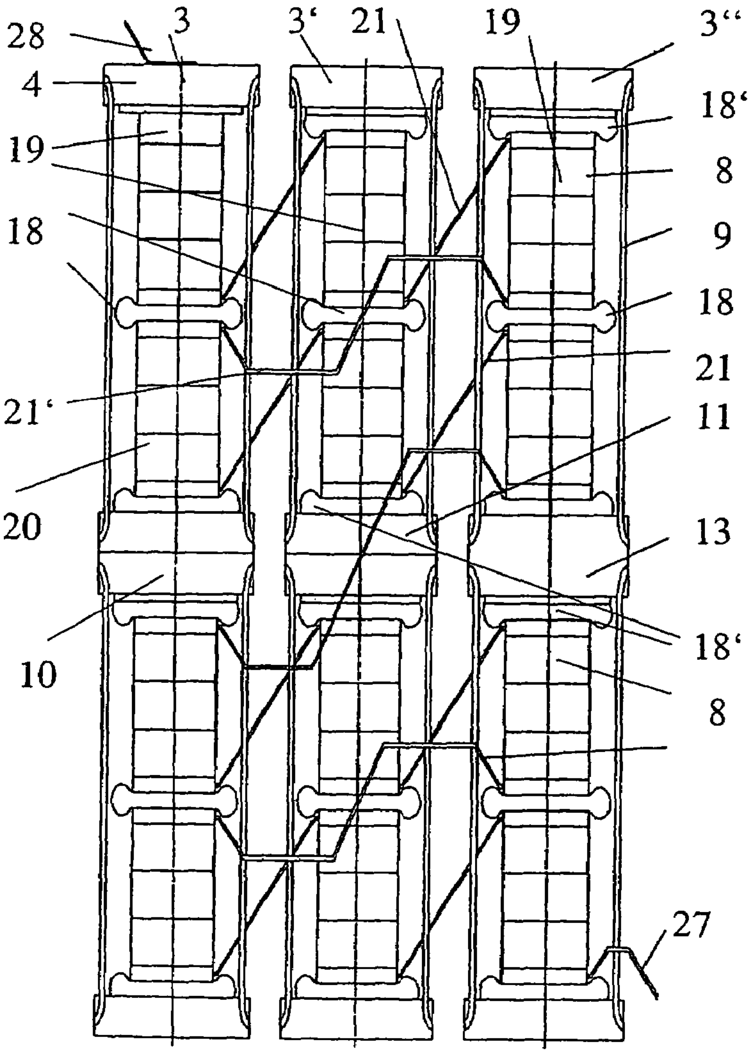
FIG. 5 a view of the active part of another embodiment of a gas-insulated surge arrester according to the invention, wherein the active part comprises three varistor columns that contain varistors as well as insulators, and FIG. 6 a view of one of the insulators of the active part according to FIG. 5.

FIG. 5 shows that the active part may also contain two or more adjacently arranged varistor columns 3, 3', 3" instead of only one varistor column. Although it would be conceivable to electrically connect these columns in parallel in order to achieve a higher current carrying capacity, they are usually connected in series—as shown in FIG. 5. This series circuit is realized with the aid of insulators 18, 18' that make it possible to electrically interconnect sections of the adjacently arranged columns. This in turn makes it possible to significantly shorten the size of the arrester and consequently to attain particular advantages for the utilization in high voltage levels. The respective insulators 18 serve for separating the potentials of two adjacent varistors 8 in the varistor column 3, 3' or 3" such that two mutually insulated column sections 19 and 20 are formed. The insulators 18', in contrast, serve for separating the potential of a varistor 8 in the varistor column from the potential of an electrode of this varistor column, e.g., the electrode 13. In addition, current connectors 21, 21' are provided for interconnecting the column sections of the different varistor columns 3, 3', 3". The current connectors 21 connect the column sections 19 or 20 and the current connectors 21 connect the column sections 19 and 20. For example, the current connector 21 connects the column section 19 in the varistor column 3' to the column section 19 in the varistor column 3", and the current connector 21' connects the column section 19 in the varistor column 3" to the column section 20 in the varistor column 3.

Figure 6:
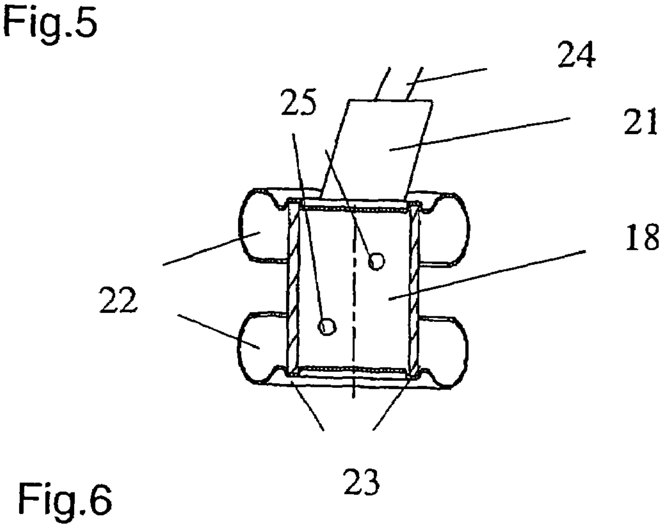

FIG. 6 shows that the insulators 18 and, accordingly, the insulators 18' can be respectively realized in a tubular fashion. The tube axes are aligned in the direction of the axes of the varistor columns and the axis of the encapsulation 1, respectively. The two annular ends of the insulators 18 respectively form a tilt-proof support for one of the varistors 8, one of the electrodes, e.g., the electrode 10, or metal disks provided for extending the column, if so required. The partial columns 7, 7' and the varistor columns 3, 3', 3" are respectively characterized by a high mechanical stability after the loop-type clamps 9 are tightened. One of two field control electrodes 22 for homogenizing the electric field acting upon the insulator 18 during the operation of the arrester is provided on each of the two tube ends of the insulator 18. Both field control electrodes 22 are provided with an annular bead 23 that serves for receiving the tube end and for centering the insulator 18. A field control electrode is not required on the tube end of the insulator 18' that lies on the electrode, e.g., the electrode 11, because the electrode 11 itself has a field-controlling effect.

One of the current connectors 21 is integrally formed onto the field control electrode 22. This simplifies the assembly of the varistor column. In addition, not only the individual components of the partial column are contacted with one another when the partial columns 7, 7' are clamped together with the aid of the loop-type clamps 9, but an electric contact with the current connectors 21, 21' is simultaneously produced. This current connector comprises a plug-type contact 24. During the assembly of the arrester, this plug-type contact 24 is connected in an electrically conductive fashion to a mating contact of another current connector 21, 21' after the varistor columns 3, 3', 3" are completed such that the desired series circuit of the arresters is realized.

Ventilation openings 25 are arranged in the tubular wall of the insulator 18 in order to ensure that the insulating gas quickly penetrates into the tube interior when the encapsulation 1 is filled with insulating gas.

LIST OF REFERENCE SYMBOLS

1 Encapsulation
1' Mounting plate
1" Encapsulation tube
2, 2R, 2S Active parts
3, 3', 3" Varistor columns
4 High-voltage electrode
5 Grounding electrode
6 Field control element
7, 7' Varistor stacks
8 Varistors
9 Loop-type clamps
10, 10', 11, 11' Intermediate electrodes
12 Holding arrangements
13 Intermediate electrode
14 Plug-type contact
15 Plug-type contact arrangement
151 Bore
152 Spring contact element
16 Plug-type contact
17, 18, 18' Insulators
19, 20 Column sections
21 Current connectors
22 Field control electrodes
23 Bead
24 Plug-type contact
25 Openings
26 Force sensor
27, 28 Current connectors
30 Current conductor
61 Metal element
62 Section of field control element, preformed sheet metal part
70, 70', 70" Pre-assembled units
A Encapsulation axis
R, S Current conductors

The invention claimed is:

1. A gas-insulated surge arrester, comprising an encapsulation of electrically conductive material that is filled with an insulating gas and aligned along an encapsulation axis, an insulator that is held on the encapsulation and serves for supporting at least one current conductor that can be connected to high voltage, at least a varistor column which is arranged in the encapsulation, is fixed on a mounting plate of the encapsulation, is aligned along the encapsulation axis, and comprises a pre-assembled unit with varistor characteristics having at least two electrodes and a first stack of varistors that is arranged between the two electrodes, as well as at least a first loop-shaped clamp that is supported on the two electrodes and that clamps together the first varistor stack, and a field control element which is electrically connected to the at least one current conductor and which is extended into a space arranged between the first stack of varistors and the encapsulation, wherein the field control element and a first plug-type contact of a plug connection are held on the current conductor of the insulator, wherein a high-voltage electrode of the varistor column that is connected in an electrically conductive fashion to the current conductor via the plug connection contains a second plug-type contact of the plug connection, and wherein the plug connection is configured such that an expansion of the varistor column during operation is compensated by a sliding movement of the second plug-type contact.

2. The arrester according to claim 1, wherein the field control element contains a metal element that is fixed on the current conductor.

3. The arrester according to claim 2, wherein a section of the field control element is realized in the form of a preformed sheet metal part and is held on the metal element.

4. The arrester according to claim 2, wherein the first plug-type contact forms part of the metal element.

5. The arrester according to claim 2, wherein the first plug-type contact is detachably fixed on the metal element.

6. The arrester according to claim 1, wherein the pre-assembled unit comprises a second stack of varistors that is arranged between a first of the two electrodes and a third electrode, as well as at least a second loop-shaped clamp that is supported on the first and the third electrode and clamps together the second varistor stack.

7. The arrester according to claim 1, wherein the varistor column comprises at least two pre-assembled units with varistor characteristics that are detachably connected to one another.

8. The arrester according to claim 1, wherein at least two varistor columns are electrically connected in series and arranged adjacent to one another, wherein said varistor columns respectively contain at least two insulators, wherein a first insulator serves for isolating electrically two adjacent varistors in the varistor column such that two mutually isolated column sections are formed, and wherein a second insulator serves for isolating electrically a varistor from an electrode of the varistor column, and wherein at least two current connectors are provided, wherein a first current connector connects the first column section in a first varistor column to the first column section in a second varistor column, and wherein the second current connector connects the first column section in the second varistor column to the second column section in the first or a third varistor column, respectively.

9. The arrester according to claim 8, wherein the insulators are respectively realized in a tubular fashion and have a tube axis that is aligned in the direction of the encapsulation axis.

10. The arrester according to claim 8, wherein at least one of the current connectors comprises a detachable connection, particularly a plug connection.

11. The arrester according to claim 9, wherein a field control electrode is respectively arranged on at least one of the tubular ends of the insulators.

12. The arrester according to claim 11, wherein the field control electrode is provided with an annular bead for receiving the tubular end and for centering the insulator.

13. The arrester according to claim 11, wherein one of the current connectors is integrally formed onto the field control electrode.

14. The arrester according to claim 9, wherein at least one ventilation opening is arranged in the tubular wall of the insulator.

15. The arrester according to claim 1, wherein the insulator supports several current conductors that can be respectively connected to one phase of a multi-phase high voltage, wherein an active part arranged in the encapsulation is assigned to each of the phase conductors, wherein said active parts respectively comprise at least one varistor column that is aligned along the encapsulation axis, as well as a high-voltage electrode and a grounding electrode, wherein each active part is surrounded by a field control element, wherein for each phase the field control element and a first contact of a plug connection are held on the phase conductor, assigned to each respective phase, and wherein a high-voltage electrode of the varistor column that is connected in an electrically conductive fashion to the assigned current conductor via the plug connection contains the second plug-type contact of the plug connection.

16. A method for manufacturing an arrester according to claim 1, wherein a pre-assembled unit that is realized in the form of the active part and aligned in the direction of the encapsulation axis is fixed on a section of the encapsulation that is realized in the form of a mounting plate, wherein a section of the encapsulation that is realized in the form of a tube is axially slipped over the active part and is fixed on the mounting plate, and wherein the active part is subsequently connected to the at least one current conductor by setting the prefabricated supporting insulator that already holds the field control electrode and the first plug-type contact on the free end of the tube, while simultaneously producing the plug connection.

17. A method for manufacturing an arrester according to claim 1, wherein a first pre-assembled unit with varistor characteristics that contains the grounding electrode and a first intermediate electrode and is aligned in the direction of the encapsulation axis is fixed on a section of the encapsulation that is realized in the form of a mounting plate, wherein a second pre-assembled unit with varistor characteristics that contains a second intermediate electrode and the high-voltage electrode and is aligned in the direction of the encapsulation axis is detachably fixed on the first pre-assem bled unit in order to complete the active part, wherein a section of the encapsulation that is realized in the form of a tube is axially slipped over the active part and detachably fixed on the mounting plate, and wherein the active part is subsequently connected to the at least one current conductor by setting the prefabricated supporting insulator that already holds the field control electrode and the first plug-type contact on the free end of the tube, while simultaneously producing the plug connection.

18. The method for manufacturing an arrester according to claim 17, wherein a third pre-assembled unit with varistor characteristics that contains a third and a fourth intermediate electrode is detachably fixed on the first intermediate electrode instead of the second pre-assembled unit.

* * * * *